United States Patent [19]

Tsai

[11] Patent Number: 5,677,007
[45] Date of Patent: Oct. 14, 1997

[54] METHOD FOR COATING SILICONE RUBBER KEYBOARDS

[75] Inventor: Chi-Lung Tsai, Taipei Hsien, Taiwan

[73] Assignee: Silitek Corporation, Taipei, Taiwan

[21] Appl. No.: 698,861

[22] Filed: Aug. 16, 1996

[51] Int. Cl.⁶ ..................... B05D 3/02
[52] U.S. Cl. ................ 427/412.1; 427/379
[58] Field of Search ................. 427/379, 387, 427/412.1

[56] References Cited

U.S. PATENT DOCUMENTS

| | | | |
|---|---|---|---|
| 3,750,246 | 8/1973 | Pessen | 29/130 |
| 3,837,876 | 9/1974 | Mayazumi et al. | 106/287 SB |
| 3,894,982 | 7/1975 | Polaski | 260/33.6 A |
| 4,670,057 | 6/1987 | Oezelli et al. | 106/236 |
| 4,704,419 | 11/1987 | Fukayama et al. | 524/188 |
| 5,008,154 | 4/1991 | Meddaugh | 427/393.5 |
| 5,238,708 | 8/1993 | Blizzard | 427/393.5 |
| 5,366,807 | 11/1994 | Fey | 427/407.1 |
| 5,462,806 | 10/1995 | Konishi et al. | 428/451 |

*Primary Examiner*—Diana Dudash
*Attorney, Agent, or Firm*—Beveridge, DeGrandi, Weilacher & Yound, L.L.P.

[57] ABSTRACT

This invention relates to a method for coating a polyurethane on to a silicon rubber key board. The so constructed key board has excellent wearing-resistance. The user may enjoy an excellent feeling of contact. A silane primer is applied and cured before application of the polyurethane.

6 Claims, No Drawings

METHOD FOR COATING SILICONE RUBBER KEYBOARDS

Field of the Invention

This invention relates to a method for coating key board, more particularly, to a method which makes a keyboard more durable, solid and with excellent wearing resistance.

The key board of conventional keyboard of the computer and the office equipment is made from silicone rubber. The silicone rubber inherently has a poor wearing resistance On the other hand, this silicone rubber provides poor contact feeling to the user.

It is the object of this invention to provide a coating method which coats a layer of PU material to the key board which in turn brings a quality similar to plastic. Besides, the so constructed key board has excellent wear-resistance and contact feeling.

Process for the method according to this invention includes the steps of:
1) Preparing and conducting general operation for key board;
2) Coating a layer of primer to the keyboard;
3) Curing and solidifying said primer;
4) Coating a layer of polyurethane PU); and
5) Curing of said polyurethane (PU) layer.

In the forgoing described process, the key board is made from silicone rubber. A primer is firstly coated to the top of said key board. The primer used heroin is a silane compound which is an organofunctionsilane polymer including sulfur, methacryloxy, amino, isocyanato. This primer has an excellent cohering capability to polyurethane (PU). Polyurethane is a compound which is mixed from a main agent containing —OH radical and another agent contain —NCO radical with predetermined ratio.

When the keyboard is coated with said primer, the coated key board is cured at 100–150 degrees Celsius for five-fifteen (5–15) minutes. Afterward, a PU layer is coated thereon and cured at 100–180 degrees Celsius for two-four (2–4) hours.

The resulted keyboard results in the following advantages.
1. wearing resistance which is higher than silicone rubber keyboard without the coating according to the invention;
2. More durable and better chemical-resistance; than a silicone rubber keyboard made without the coating according to the invention and
3. Better contact feeling than a silicone rubber keyboard without the coating according to the invention.

EXAMPLE 1

The keyboard made from general process is coated with a primor which is a silane compound containing sulfur, methacryloxy, amino, isocyanato. Afterward, the resulted primer layer is cured at 120 degreos Celsius about 10 minutes. Then a PU layer is coated to the primer. Afterward, curing it at 100–180 degrees Celsius about three (3) hours.

EXAMPLE 2

The keyboard made from general process is coated with a primer which is a silane compound containing sulfur, methacryloxy, amino, isocyanato. Afterward, the resulted primer layer is cured at room temperature about six (6) hours. Then a PU layer is coated to the primer. Afterward, curing it at 100–180 degrees Celsius about three (3) hours.

I claim:

1. A method for coating a silicone rubber keyboard, comprising:

coating said silicone rubber keyboard with a layer of primer which is a silane compound having at least one functional group selected from the group consisting of sulfur, methacryloxy, amino, and isocyanato, curing said primer layer at 100–150 degrees Celsius;

coating said cured primer layer with a layer of polyurethane; and curing said polyurethane layer at 100–180 degrees Celsius.

2. The method for coating the silicone rubber keyboard as defined in claim 1 wherein said silane compound is an organofunctionsilane polymer.

3. The method for coating the silicone rubber keyboard as defined in claim 1, wherein said primer layer is cured for 5–15 minutes; and wherein said polyurethane layer is cured for 2–4 hours.

4. A method for coating a silicone rubber keyboard, consisting essentially of:

coating said silicone rubber keyboard with a layer of primer which is a silane compound having at least one functional group selected from the group consisting of sulfur, methacryloxy, amino, and isocyanato;

curing said primer layer at 100–150 degrees Celsius;

coating said cured primer layer with a layer of polyurethane; and curing said polyurethane layer at 100–180 degrees Celsius.

5. The method for coating the silicone rubber keyboard as defined in claim 4 wherein said silane compound is an organofunctionsilane polymer.

6. The method for coating the silicone rubber keyboard as defined in claim 4, wherein said primer layer is cured for 5–15 minutes; and wherein said polyurethane layer is cured for 2–4 hours.

* * * * *